Aug. 11, 1931.  A. MOORHOUSE  1,818,002
MOTOR VEHICLE
Filed March 26, 1927
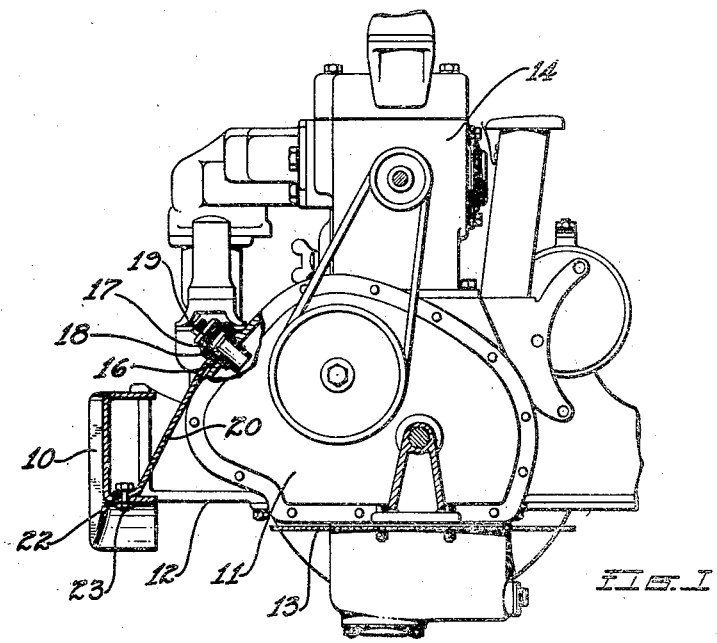
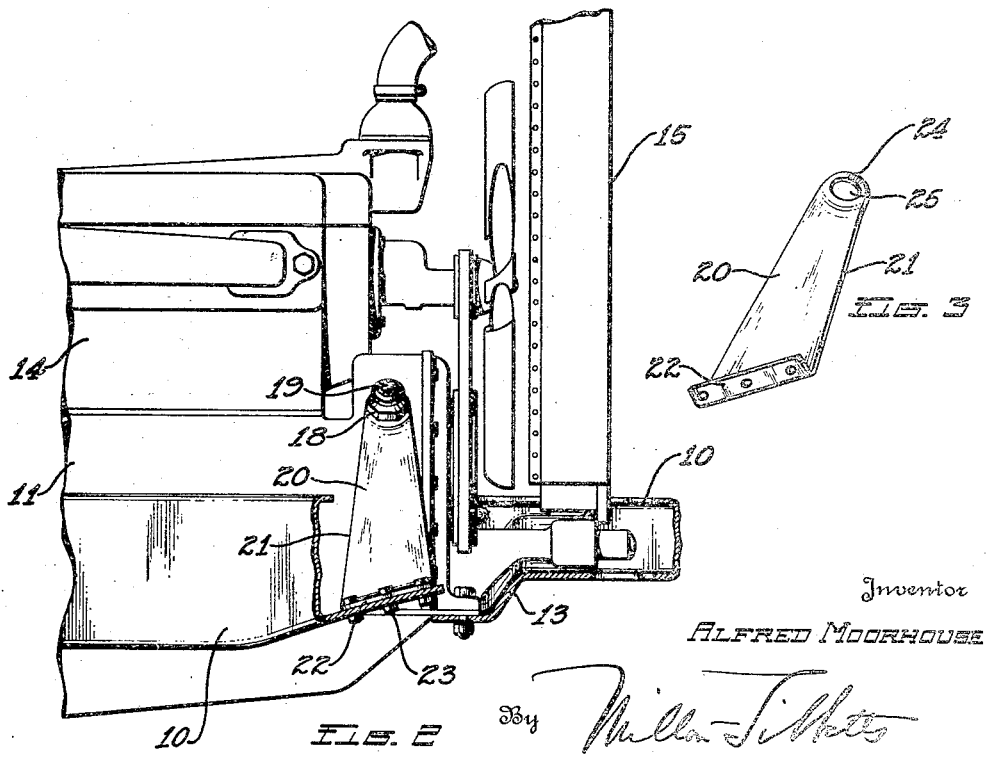
Inventor
ALFRED MOORHOUSE Patented Aug. 11, 1931

1,818,002

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed March 26, 1927. Serial No. 178,560.

This invention relates to motor vehicles and more particularly to a stiffening member for the chassis frame.

An object of the invention is to prevent weaving of the chassis frame when the vehicle is moving over rough roads or at high speeds.

Another object of the invention is to provide means for stiffening the chassis frame to prevent shimmying of the radiator occurring when moving over rough roads or at high speeds and also to prevent wheel shimmy occurring under the same conditions.

Another object of the invention is to provide a stiffening member connecting the chassis frame and engine crankcase in such a manner that the frame and crankcase are substantially trussed together to prevent weaving of the frame.

Another object of the invention is to provide a stiffening member for the chassis frame which may be easily and quickly installed in motor vehicles under construction and such vehicles as are now in general use.

A further object of the invention is to provide a brace or bracket member for a chassis frame which has the advantages of a positive stiffening means for the frame, is highly efficient in operation and yet of marked simplicity so that its manufacture may be economically facilitated.

Other objects of the invention will appear from the following description taken in connection with the drawings, which form a part of this specification, and in which:

Fig. 1 is a front elevation of a side member of a frame and an internal combustion engine supported thereby, partly in section and partly broken away, illustrating the invention as applied;

Fig. 2 is a side elevation of the side members of a frame and an internal combustion engine supported thereby, partly in section and partly broken away, also illustrating the invention as applied, and Fig. 3 is a perspective view of the brace.

Referring by numerals to the drawings, 10 represents the side members of a chassis frame of a motor vehicle. An internal combustion engine is supported upon the frame by the usual three point suspension method. The engine comprises a crankcase 11 having upon its rear end arms 12 bearing upon and secured to the side members and supported at its forward end by a cross member 13. A cylinder block 14 carrying suitable intake and exhaust devices is mounted upon the crankcase and is adapted for connection to a radiator 15 mounted upon the cross member 13 or other suitable means of supporting the radiator may be employed.

Formed upon the wall of the crankcase near the forward end thereof is a boss 16 tapped to receive an inspection plug 17. As shown, the plug 17 comprises a tubular member having a radial flange 18 which provides means for adjusting the plug and co-operates with the boss 16 to provide a clamping means, the object of which will hereinafter appear. The outer end of the tubular member is internally threaded to receive a plug or closure 19 which may be easily and quickly removed for the purpose of inspection without disturbing the tubular member.

Riveted, bolted or otherwise secured upon the side member 10 of the frame is a brace or bracket 20. As shown, the brace or bracket comprises a flat body portion somewhat wider at one end than at the other with diverging edges as indicated at 21. The wider end of the bracket is bent to form a beveled flange 22 conforming to the curvature in the lower edge of the side member 10 to which it is secured by a plurality of bolts 23, and the narrow end of the bracket is rounded as indicated at 24 and apertured as shown at 25 to receive the tubular member of the inspection plug 17, the radial flange 18 upon the tubular member securely clamping the bracket upon the boss 16 upon the seating of the tubular member.

A brace or bracket so placed and secured serves a twofold function in that it lends strength and rigidity to the frame to prevent the weaving thereof which is apt to occur on rough roads or at high speeds. This stiffening brace or bracket arranged between the frame and the crankcase of the engine produces a trussed effect which insures a more rigid connection than is possible in instances where an engine is supported upon the frame solely by supporting arms integral with the crankcase, since in such instances there is a shearing effect only.

By this means of stiffening the frame to overcome the weaving thereof there is produced a very decided reduction in the movements or shimmy of the radiator usually developing on rough roads or at high speeds, such movements being partly nil or negligible. It has also been found that a frame stiffened in the foregoing manner serves to control wheel shimmy to a great extent owing to the increased rigidity of the frame which very materially assists the snubbers to control the movements of the axle.

While I have shown and described the preferred embodiment of my invention, I wish it to be understood that I do not confine myself to the precise details of construction herein set forth, by way of illustration, as it is apparent that many changes and variations may be made herein, by those skilled in the art without departing from the spirit of the invention or exceeding the scope of appended claims.

Having thus described my invention, what I claim and desire to secure by Letters Patent is:

1. In a motor vehicle, the combination with a chassis frame and the crankcase of an internal combustion engine supported thereby, of an inspection plug in the wall of a crankcase and a bracket connecting the inspection plug to the frame.

2. In a motor vehicle, the combination with the chassis frame and the crankcase of an internal combustion engine supported thereon, of an inspection plug threaded into the wall of the crankcast, a bracket mounted upon the inspection plug and rigidly connected to a side member of the frame.

3. In a motor vehicle, the combination with the chassis frame and the crankcase of an internal combustion engine supported by the frame, of an inspection plug threaded into the wall of the crankcase, a flange upon the inspection plug, a brace mounted upon the inspection plug between the flange and the crankcase, a beveled flange upon the brace conforming to the lower edge of a side member of the frame and means securing the beveled flange to the lower edge of the side member.

4. In a motor vehicle, the combination with a chassis frame including the side members and a cross member, of a crankcase of an internal combustion engine supported by the side members and the cross member, and a rigid brace securing one of the side members to the crankcase adjacent the cross member.

5. In a motor vehicle, the combination with the chassis frame including the side members and a cross member, of a crankcase of an internal combustion engine having a three-point suspension on the frame and a member rigidly connecting one of the side members to the crankcase adjacent the cross member.

6. In a motor vehicle, the combination with the chassis frame including the side members and a cross member, of a crankcase having one end supported by the side members and the other end having a single bearing on the cross member, and a brace rigidly connecting one of the side members adjacent the cross member to the crankcase.

7. In a motor vehicle, the combination with a chassis frame including the side members and a cross member, of a crankcase having a single bearing upon each of the side members and the cross member, an inspection plug in the wall of the crankcase, and a brace mounted upon the inspection plug and connected to one of the side members adjacent to the cross member, whereby the frame is trussed to the crankcase.

In testimony whereof I affix my signature.

ALFRED MOORHOUSE.